United States Patent
Becker et al.

(10) Patent No.: US 6,950,884 B2
(45) Date of Patent: Sep. 27, 2005

(54) DEVICE AND METHOD FOR BIDIRECTIONAL DATA TRANSFER BETWEEN TWO PROCESSORS WHEREIN DMA CHANNEL PROVIDES IMPROVED DATA TRANSFER BETWEEN PROCESSORS

(75) Inventors: Burkhard Becker, Ismaning (DE); Michael Schneider, München (DE); Peter Schmidt, Erpolzheim (DE); Peter Jung, Otterberg (DE); Tideya Kella, München (DE); Jörg Plechinger, München (DE); Markus Dötsch, Schliern (CH)

(73) Assignee: Infineon Technologies AG, Munich (DE)

( * ) Notice: Subject to any disclaimer, the term of this patent is extended or adjusted under 35 U.S.C. 154(b) by 924 days.

(21) Appl. No.: 09/829,330

(22) Filed: Apr. 9, 2001

(65) Prior Publication Data

US 2001/0042144 A1 Nov. 15, 2001

(30) Foreign Application Priority Data

Apr. 7, 2000 (DE) .......................... 100 17 362

(51) Int. Cl.[7] .................. G06F 11/08; G06F 11/16; G06F 12/02; G06F 13/00; G06F 13/16
(52) U.S. Cl. .................. 710/22; 710/33; 710/240; 714/6; 714/7; 714/8; 714/9
(58) Field of Search .................. 710/22, 33, 240; 714/6–9

(56) References Cited

U.S. PATENT DOCUMENTS 5,845,130 A * 12/1998 Goff et al. .................. 710/240
6,237,108 B1 * 5/2001 Ogawa et al. .................. 714/6

FOREIGN PATENT DOCUMENTS

DE 31 49 678 C2 5/1984
DE 34 24 587 A1 1/1986

* cited by examiner

*Primary Examiner*—Tammara Peyton
(74) *Attorney, Agent, or Firm*—Laurence A. Greenberg; Werner H. Stemer; Ralph E. Locher

(57) ABSTRACT

A device for the bidirectional transfer of data between two processors contains input and output control information memories for storing an item of binary control information for input and output memories. The memories can be accessed by the second processor and, via a DMA channel, by the first processor. The access operations of both processors to these memories are coordinated on the basis of the content of the input and output control information memories.

11 Claims, 4 Drawing Sheets

ES

| sub_1 16x 10 bits | sub_2 | sub_3 | sub_4 | sub_5 | sub_6 | sub_7 | sub_8 | sub_9 | sub_10 |
|---|---|---|---|---|---|---|---|---|---|

C_ES

| e_si_1 | e_si_2 | e_si_3 | e_si_4 | e_si_5 | e_si_6 | e_si_7 | e_si_8 | e_si_9 | e_si_10 |
|---|---|---|---|---|---|---|---|---|---|

| sub_1 16x 12 bits | sub_2 | sub_3 | sub_4 | sub_5 | sub_6 | sub_7 | sub_8 | sub_9 | sub_10 |
|---|---|---|---|---|---|---|---|---|---|

C_AS

| e_so_1 | e_so_2 | e_so_3 | e_so_4 | e_so_5 | e_so_6 | e_so_7 | e_so_8 | e_so_9 | e_so_10 |
|---|---|---|---|---|---|---|---|---|---|

Fig. 2B

DEVICE AND METHOD FOR BIDIRECTIONAL DATA TRANSFER BETWEEN TWO PROCESSORS WHEREIN DMA CHANNEL PROVIDES IMPROVED DATA TRANSFER BETWEEN PROCESSORS

BACKGROUND OF THE INVENTION

Field of the Invention

The invention relates to a device and a method for the bidirectional transfer of data between a first and a second processor.

In digital circuit technology, an interface is used for data transfer between two processors or functional units. An interface usually contains a microprocessor which is used as an address generator and executes a program for reading a memory area, e.g. of the first processor, to a data buffer of the interface and a program for writing the buffered data to a memory area of the second processor. Parallel interfaces permit higher data transmission rates to be achieved than with serial interfaces.

Much higher data transmission speeds than with a conventional interface can be achieved using a direct memory access (DMA) channel. In the case of a DMA channel, a counter is used as an address generator instead of the microprocessor. For initialization, the address register is loaded with the start address of the memory area that is to be read, and the byte number register is informed of the number of bytes that are to be transmitted. The control register of the DMA channel establishes whether the addresses need to be counted upward or downward and whether the memory being accessed needs to be written to or read from. The data transmission can be carried out in blocks and takes place without processing a program on the basis of the counting clock pulse. To transmit a data word from the first memory area to the second memory area, two counting clock pulses are required (one counting clock pulse for reading a data word from the first memory area to the buffer of the interface and one counting clock pulse for writing the buffered data word to the second memory area).

If one processor cannot start a particular computation routine until the other processor provides a particular intermediate result, and vice versa, then it is necessary to take account not only of the feature of the maximum data transmission rate of the interface, but also of the feature of the smoothest possible reciprocal flow control for the processors. For this purpose too, a microprocessor is usually used which, by executing a suitable program, activates the processors or puts them into a hold state.

SUMMARY OF THE INVENTION

It is accordingly an object of the invention to provide a device and a method for data transfer between two processors which overcome the above-mentioned disadvantages of the prior art devices and methods of this general type, which device and method permits rapid bidirectional data transfer between the two processors and allows flexible and low-delay flow coordination for the two processors.

With the foregoing and other objects in view there is provided, in accordance with the invention, a device for a bidirectional transfer of data. The device contains a first processor, a second processor, and an input memory connected to the second processor. The input memory has a plurality of memory blocks for receiving output data from the first processor. An output memory is provided with a plurality of memory blocks for providing input data for the first processor, the output memory is connected to the second processor. An input control information memory is connected to the input memory and stores an item of binary control information for each of the memory blocks of the input memory. An output control information memory is connected to the output memory and stores an item of binary control information for each of the memory blocks of the output memory. At least one direct memory access (DMA) channel is provided for writing the output data from the first processor to the input memory and for reading the input data for the first processor from the output memory. The DMA channel is connected to the first processor, the input memory and the output memory. Access to the input memory and the output memory is regulated such that a write access of the first processor and a read access of the second processor to the input memory is permitted on a basis of the item of control information stored in the input control information memory. A write access of the second processor and the read access of the first processor to the output memory is permitted on a basis of the item of control information stored in the output control information memory.

Accordingly, the use of the DMA channel provides for the fastest possible data transfer between the two processors. The two control information memories provide a simple way of permitting efficient and time-saving reciprocal process control for the two processors, specifically by virtue of the access operations of the two processors to the input and output memories being coordinated on the basis of the content of the input and output control information memories.

The fact that the write access of the first processor and the read access of the second processor to the input memory is regulated on the basis of the control information stored in the input control information memory makes it possible both to prevent the first processor from overwriting a memory block of the input memory with new data before the memory block has been read by the second processor. In addition, a memory block of the input memory is prevented from being read by the second processor for the second time without new data coming from the first processor having been stored in the memory block in the meantime. Elimination of these two instances (overwriting of unread data and repeated reading of identical data) ensures a smooth flow for the data transport from the first processor to the second processor.

The process control in the opposite data transfer direction takes place in a similar manner on the basis of the control information stored in the output control information memory. The measure according to the invention makes it possible to prevent data stored for output in a memory block of the output memory from being overwritten before transfer to the first processor without having been read, and to prevent the first processor from repeatedly reading memory blocks of the output memory whose data content has not changed.

Consequently, rapid communication without data loss is achieved between the two processors even if unforeseeable fluctuations in the data processing speed occur in one or both processors.

Preferably, the write access of the first processor is controlled such that a memory block of the input memory can be written to only if the item of binary control information for the memory block is in a first state (e.g. 0). Once the data have been written to the memory block of the input memory, the associated item of binary control information is set to the second state (e.g. 1). Preferably, a read access operation of the second processor to a memory block of the input memory is only permitted provided that the item of binary control information for the memory block is available in the second state (1).

The write and read access operations to the output memory can be regulated in a similar manner by setting and resetting the binary control information in the output control information memory.

One particularly preferred refinement of the invention is characterized in that the first processor is a digital signal processor (DSP) and the second processor is a hardware logic circuit. Such a configuration makes it possible to move time-consuming computation procedures from the program-controlled data processing flow of the signal processor to the comparatively faster hardware logic circuit. In this context, the data transfer device according to the invention provides the prerequisite for smooth interaction of these two processors.

The data transfer device according to the invention is used particularly advantageously in such a configuration of a turbo decoder for a mobile radio receiver. Only by permitting rapid data interchange and reciprocal flow control between the DSP and the hardware logic circuit does it become possible to decode turbo codes in the area of mobile radio.

In accordance with an added feature of the invention, if the output memory and the input memory have different memory sizes, a number of the memory blocks is identical in both of the output memory and the input memory.

In accordance with another feature of the invention, at least one of the input memory and the output memory are cyclic memories.

With the foregoing and other objects in view there is further provided, in accordance with the invention, a method for a bidirectional transfer of data. The method includes providing a first processor, a second processor, an input memory connected to the second processor and having a plurality of memory blocks for receiving output data from the first processor, an output memory connected to the second processor and having a plurality of memory blocks for providing input data for the first processor, an input control information memory storing an item of binary control information for each of the memory blocks of the input memory, and an output control information memory storing an item of binary control information for each of the memory blocks of the output memory. A write access operation, taking place through a direct memory access (DMA) channel, of the first processor and a read access operation of the second processor to the input memory is permitted on a basis of the item of control information stored in the input control information memory. The write access operation of the second processor and the read access operation, taking place through the DMA channel, of the first processor to the output memory is permitted on a basis of the item of control information stored in the output control information memory.

Other features which are considered as characteristic for the invention are set forth in the appended claims.

Although the invention is illustrated and described herein as embodied in a device and a method for data transfer between two processors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE DRAWINGS

FIG. 2A is a schematic illustration of an input memory subdivided into memory blocks and of an associated control information memory;

FIG. 2B is a schematic illustration of an output memory subdivided into memory blocks and of an associated output control information memory;

DESCRIPTION OF THE PREFERRED EMBODIMENTS

Figure 1:
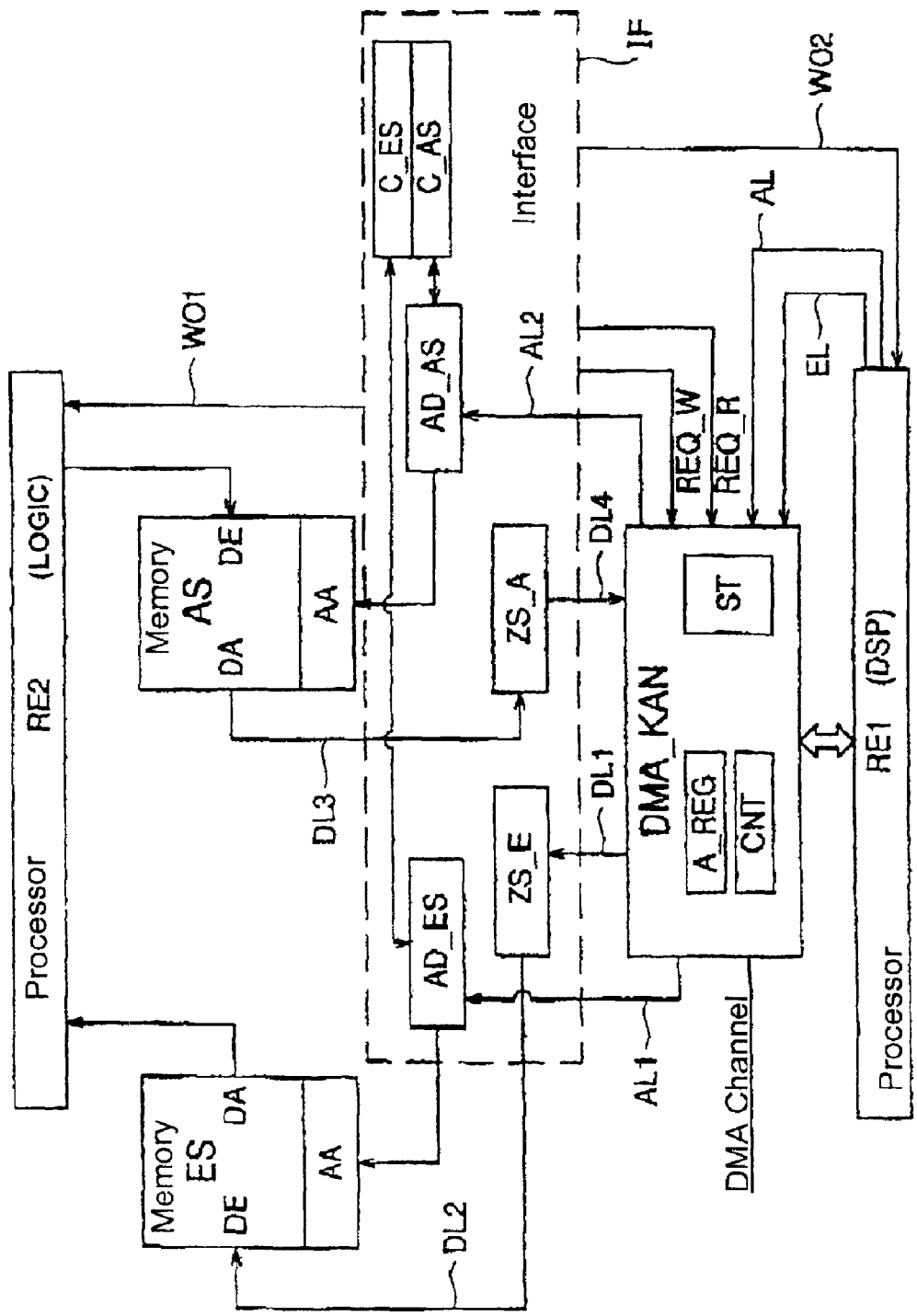
FIG. 1 is a block diagram of an illustrative embodiment of a data transfer device according to the invention.

In all the figures of the drawing, sub-features and integral parts that correspond to one another bear the same reference symbol in each case. Referring now to the figures of the drawing in detail and first, particularly, to FIG. 1 thereof, there is shown a device for the bidirectional transfer of data between a first processor RE1 and a second processor RE2, which is coupled to an input memory ES and to an output memory AS. The device contains a direct memory access (DMA) channel DMA_KAN and an interface IF.

By way of example, the first processor RE1 can be a digital signal processor (DSP) operated using firmware, and the second processor RE2 can be a fast, "hardwired" logic circuit.

The DMA channel DMA_KAN contains a controller ST, a data word counter CNT and an address register A_REG. The input and output memories ES and AS each have a data input DE and a data output DA and are equipped with an address controller AA in the customary manner.

The interface IF contains an address decoder AD_ES for the input memory, an address decoder AD_AS for the output memory and buffers ZS_E and ZS_A for the two data transfer directions from RE1 to RE2 and from RE2 to RE1. In addition, the interface IF contains an input control information memory C_ES associated with the input memory ES, and an output control information memory C_AS associated with the output memory AS.

FIG. 2A is a schematic illustration of the organizational configuration of the input memory ES and of the associated input control information memory C_ES. The input memory ES is subdivided, by way of example, into ten memory blocks sub_1, sub_2, ..., sub_10. Each memory block contains, by way of example, 16 data words having a word length of 10 bits.

The input control information memory C_ES is a register which is able to store a number of binary information items which corresponds to the number of memory blocks in the input memory ES. In the example shown, the input control information memory C_ES is thus a 10-bit register. The bits of the register are denoted by the reference symbols e_si_1, e_si_2, . . . , e_si_10 in FIG. 2A.

In terms of the blockwise partitioning, the configuration of the output memory AS (see FIG. 2B) corresponds to the configuration of the input memory ES. Accordingly, the output memory AS likewise has, by way of example, ten memory blocks sub_1, sub_2, . . . , sub_10.

In the example shown, the output control information memory C_AS is a 10-bit register for the bits e_so_1, e_so_2, . . . , e_so_10.

The memory block size of the input memory ES (e.g. 16×10 bits) and the memory block size of the output memory AS (e.g. 16×12 bits) can be different. Furthermore, the two memories can also contain a different number of memory blocks.

The way in which the data transmission device according to the invention works is now described.

First, the data transmission from the first processor RE1 to the second processor RE2 (input procedure) is described. As soon as an input control line EL is activated by the first processor RE1, the DMA channel DMA_KAN can write data to the input memory ES via the data line DL1, the buffer ZS_E and the data line DL2. To this end, the controller ST is informed of the counting direction and of a start address in the input memory ES. The counter CNT then generates the destination addresses (in ES) for the data which are to be stored. Since the data are being transmitted in blocks, the destination addresses correspond to the addresses of one or more memory blocks sub_1, sub_2, . . . , sub_10 in the input memory ES.

An address line AL1 is used to inform the address decoder AD_ES of the destination addresses of the memory blocks that are to have information written to them. The address decoder AD_ES is connected to the input control information memory C_ES.

By way of example, the memory blocks sub_5, sub_6 and sub_7 need to be overwritten with new data. The address decoder AD_ES or another functional unit provided in the interface IF for this purpose checks whether each of the appropriate bits e_si_5, e_si_6 and e_si_7 has the value 0 or 1. If all bits have the value 0, the aforementioned memory blocks are overwritten with the new data, and the bits e_si_5, e_si_6 and e_si_7 associated with these memory blocks are set to the value 1 in the input control information memory C_ES. Otherwise, i.e. provided that only one of the bits e_si_5, or e_si_6 or e_si_7 associated with the memory blocks which are to have information written to them has the value 1, two sequences are possible: either the data transmission is not actually started at all, i.e. none of the memory blocks sub_5, sub_6 and sub_7 has information written to it, (irrespective of the value of the first bit e_si_5), e.g. by deactivation a DMA write request REQ_W. The memory blocks under consideration sub_5, sub_6, sub_7 are then not overwritten until at a later instant, when the aforementioned condition has been fulfilled. The second option, that is preferred in this case, is, provided that the first bit e_si_5 has the value 0, first to start the write access operation by writing to the memory block sub_5 and to terminate the write access operation only upon reaching the first memory block whose bit has the value 1 in the input control information memory C_ES.

The input memory ES is read by the second processor RE2 likewise in blocks. For this purpose, the second processor RE2 likewise checks the value of those bits of the input control information memory C_ES which are associated with the memory blocks which are to be read, using a process which is not shown in more detail. Provided that all the bits have the value 1, the memory block or memory blocks are read via the data output DA of the input memory ES. If only one bit, associated with one of the memory blocks which are to be read, of the input control information memory C_ES has the value 0, the read procedure is either not actually started at all or is terminated when the memory block whose bit has the value 0 is reached. Since no new data are available, the second processor RE2 is then put into a waiting state automatically or, by way of example, by a control line W01.

If (after a new write access operation of the DMA channel DMA_KAN) a first or all of the bits, associated with the memory blocks which are to be read, of the input control information memory C_ES have the value 1, the waiting state is cleared and the associated memory blocks of the input memory ES are read by RE2 via the data output DA.

Immediately after each memory block sub_1, sub_2, . . . , sub_10 of the input memory ES has been read, the associated bit e_si_1, e_si_2, . . . , e_si_10 of the input control information memory C_ES is reset to the value 0. The associated memory block sub_1, sub_2, . . . , sub_10 is thus enabled again for the writing of data by the first processor RE1.

The data transfer in the opposite direction takes place in a similar manner. By way of example, the first processor RE1 uses an output control line AL to inform the DMA channel DMA_KAN of a read request relating to one or more memory blocks (e.g. sub_5, sub_6, sub_7) of the output memory AS. The DMA channel DMA_KAN produces the appropriate data word or memory block addresses in the manner already described. The address decoder AD_AS for the output memory AS is informed of these addresses via an address line AL2. The address decoder AD_AS or another unit in the interface IF checks whether the associated bits of the output control information memory C_AS (namely e_so_5, e_so_6, e_so_7, see FIG. 2B) have the value 1. If this is the case, the DMA channel DMA_KAN is activated, for example by activating a DMA read request REQ_R, and the data of the aforementioned memory blocks are read via a data line DL3, the buffer ZS_A and a data line DL4. After each memory block has been read, that bit in the output control information memory C_AS that is associated with the memory block is reset to the value 0.

Provided that one of the register bits e_so_5, e_so_6, e_so_7 associated with the memory blocks sub_5, sub_6, sub_7 which are to be read has the value 0, then (on the basis of one of the two options already described for the input procedure) either just this memory block or all the memory blocks affected by the read request is/are not read. The processor RE1 is then put into a waiting state automatically or, by way of example, by a line W02 until the appropriate bit has the value 1, i.e. the associated memory block and hence possibly also subsequent memory blocks can be read.

To prevent memory blocks sub_1, sub_2, . . . , sub_10 of the output memory AS which have not yet been read from being overwritten by the second processor RE2, each memory block of the output memory AS can have information written to it only if the associated bit of the output control information memory C_AS has the value 0. As soon as new data have been written to a memory block sub_1, sub_2, ..., sub_10 of the output memory AS, the associated bit of the output control information memory C_AS is set to the value 1. The memory block has now been enabled for read access.

Figure 3:
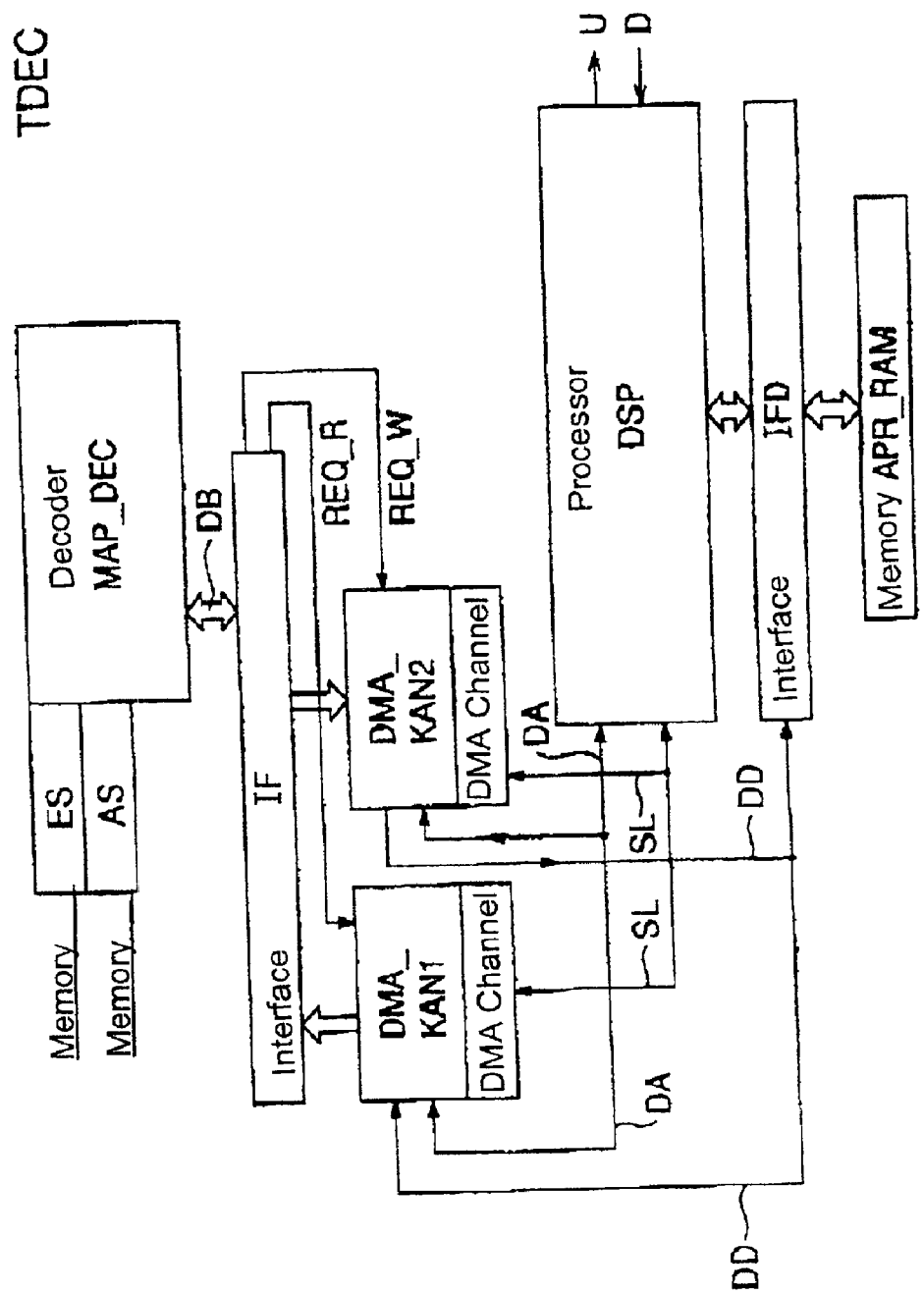
FIG. 3 is a block diagram of a turbo decoder for a mobile radio receiver in which two data transfer devices according to the invention are used between a digital signal processor and a hardware circuit.

FIG. 3 shows an illustrative embodiment of the data transfer device according to the invention in a turbo decoder TDEC for a mobile radio receiver. The turbo decoder TDEC has the task of decoding a radio signal which is provided with error protection coding at the transmitter end using a turbo code and is transmitted via a channel subject to interference (air interface). Some of the functional elements of the turbo decoder TDEC which correspond to the elements shown in FIG. 1 have been provided with the same reference symbols as in FIG. 1.

The generation of a turbo code and algorithms for decoding it are known and are described, by way of example, in the book titled "Analyse und Entwurf digitaler Mobilfunksysteme" [Analysis and Design of Digital Mobile Radio Systems] by P. Jung, Stuttgart, B. G. Teubner, 1997, on pages 343 to 368. They are not described in any more detail below. In general, however, it can be stated that decoding a turbo code requires a decidedly high level of computation effort as compared with a conventional code, and for this reason should not be implemented to date in a mobile radio receiver having limited energy resources.

The turbo decoder TDEC shown in FIG. 3 contains a MAP (Maximum A Posteriori) decoder MAP_DEC, which is a symbol estimator and is equipped with the input memory ES and the output memory AS. The MAP decoder MAP_DEC is equivalent to the processor RE2 in FIG. 1. Instead of the MAP decoder MAP_DEC, a Viterbi decoder may also be provided, for example.

The MAP decoder MAP_DEC is connected to the interface IF by a bidirectional bus DB. The interface IF is connected to a DSP (equivalent to the first processor RE1) via two programmable DMA channels DMA_KAN1 and DMA_KAN2, so as to be capable of data interchange. Each of the two DMA channels DMA_KAN1 and DMA_KAN2 is similar to the DMA channel shown in FIG. 1, but is configured for one data transfer direction only. Data is interchanged between the DSP and the DMA channels DMA_KAN1/2 via an internal DSP interface IFD and data lines DD. Address and control data are interchanged between the DMA channels DMA_KAN1/2 and the DSP via a bus system that is labeled using the reference symbols DA and SL in FIG. 3. In addition, the DSP can use the internal interface IFD to access a memory APR_RAM which temporarily stores data which are interchanged between the DSP and the MAP decoder MAP_DEC via the two DMA channels DMA_KAN1/2.

The way in which the turbo decoder TDEC operates is as follows. The DSP receives a data signal D detected and demodulated by the mobile radio receiver in the form of a finite series of data symbols (e.g. bits). The data symbol series D contains the useful data to be decoded and redundancy data, which have been added to the useful data during the turbo coding at the transmitter end. The task of the turbo decoder TDEC is to reconstruct the useful information coded at the transmitter end with the highest possible success rate (e.g. low bit error rate). For this purpose, essentially three data processing steps are required, namely random conditioning of the data (to take into account the radio transmission channel interference sustained), interleaving and de-interleaving of the data and a calculation step for (approximately) estimating the values of the individual data symbols (symbol estimation).

The aforementioned steps need to be repeated a number of times in order to determine reliable estimated values for the data symbols which are to be ascertained. The estimated values are refined within the scope of the iteration process. An iteration loop contains:

a first symbol estimation on the basis of a first part of redundancy data (in MAP_DEC), interleaving of the first estimated data generated (in the DSP), random conditioning of the interleaved data (in the DSP), a second symbol estimation of the randomly conditioned data using a second part of redundancy information (in MAP_DEC), de-interleaving of the second estimated data generated (in DSP), and random conditioning of the de-interleaved data (in DSP).

The de-interleaved second estimated data generated when passing through an iteration loop are used as feedback information for the subsequent iteration pass and are taken into account in the first symbol estimation step.

After a prescribed number of iteration passes (for example 5), the second estimated data are output as output signal U by the DSP. The iteration method explained is known and is described, for example, in the aforementioned book by P. Jung.

On the basis of the description above, four data transfer operations between the DSP and the MAP decoder MAP_DEC need to take place within one iteration loop when splitting the calculation steps between the DSP and the MAP decoder MAP-DEC, as proposed in this case. The data transfer from the DSP to the MAP decoder MAP_DEC is handled by the first DMA channel DMA_KAN1, and data transfer from the MAP decoder MAP_DEC to the DSP is handled by the second DMA channel DMA_KAN2.

Figure 4A:
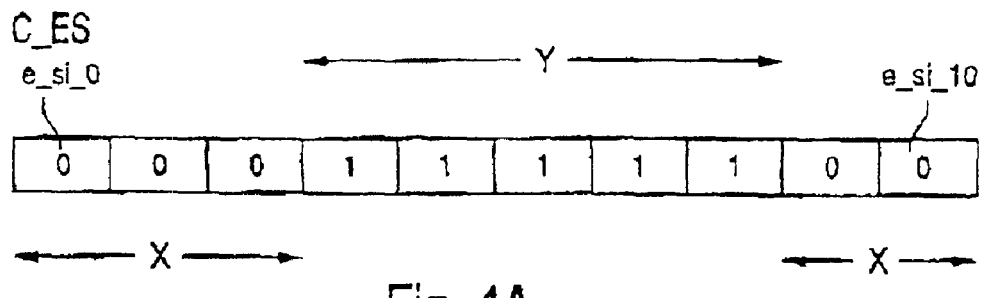
FIG. 4A is a schematic illustration of an example of memory use in the input control information memory.

FIG. 4A shows one possible use of the input control information memory C_ES for the DMA channel DMA_KAN1 during the iterative turbo decoding. Those memory blocks of the input memory ES which are associated with the control information bits located in a register area Y have had new data (from the DSP) written to them by the DMA channel DMA_KAN1 and have been made available to the MAP decoder MAP_DEC for processing. Those memory blocks of the input memory ES which are associated with the control information bits located in the register areas X have either already been read by the MAP decoder MAP_DEC or have not yet had information written to them by DMA channel DMA_KAN1.

Figure 4B:
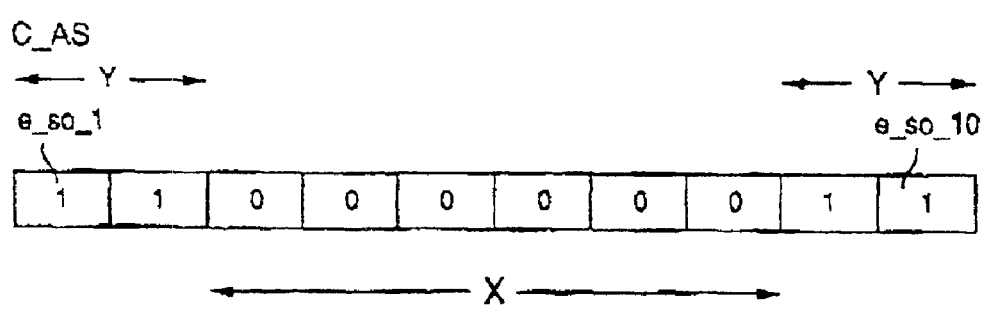
FIG. 4B is a schematic illustration of an example of memory use in the output control information memory.

FIG. 4B shows one possible use of the output control information memory C_AS in connection with the data transfer via the DMA channel DMA_KAN1. Those memory blocks of the output memory AS which are associated with the control information bits in the register areas Y are output values for the map decoder MAP_DEC which are available for retrieval via the DMA channel DMA_KAN2. Memory blocks of the output memory AS which are associated with the control information bits in the register area X have either already been read by the DMA channel DMA_KAN2 or have not yet been calculated by the MAP decoder MAP_DEC and written to the output memory AS.

Figure 4C:
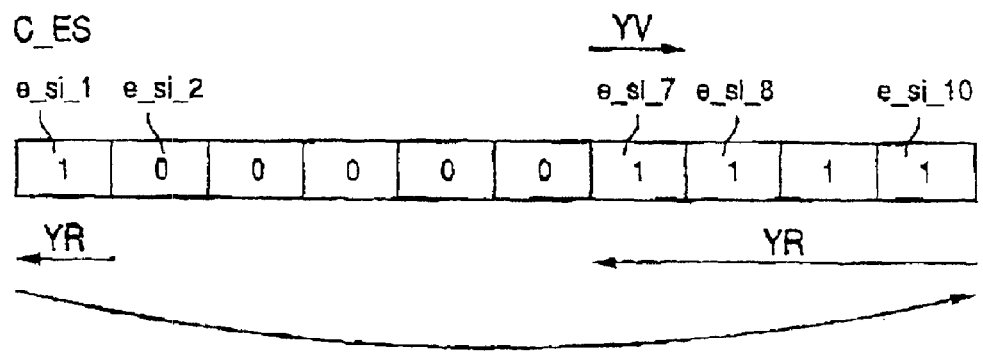
FIG. 4C is a schematic illustration of a further example of memory use in the input control information memory to explain memory access cycles.
Figure 4D:
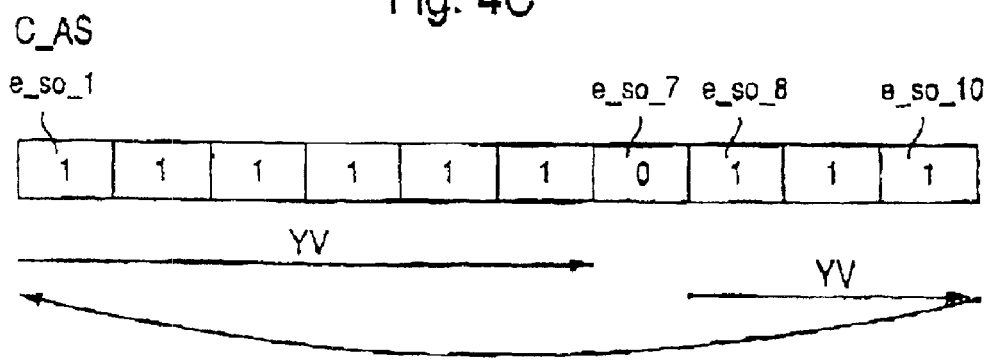
FIG. 4D is a schematic illustration of a further example of memory use in the output information memory to explain memory access cycles.

FIGS. 4C and 4D show further examples of the use of the input and output control information memories for one of the DMA channels DMA_KAN1/2 to explain memory access cycles when cyclic input and output memories ES, AS are used. In cyclic memories, read and write access operations always take place in rising or falling memory block order; in the direction of rising memory blocks, when the last memory block sub_10 has been reached, the memory block sub_1 is automatically read or written to as the next memory block, and in the direction of falling memory blocks, when the first memory block sub_1 has been reached, the memory block sub_10 is automatically written to or read as the next memory block. The input and output memories ES, AS used in the turbo decoder TDEC are preferably such cyclic memories, since, within the context of the symbol estimations, forward recursion runs and backward recursion runs need to be carried out over a plurality of adjacent data blocks in order to calculate forward and backward recursion metric values.

As shown in FIG. 4C (input control information memory C_ES), the memory blocks sub_1 and sub_7 to sub_10 are ready for processing in the MAP decoder MAP_DEC. In this context, forward recursion will always extend over just a single, namely the i-th, memory block, while backward recursion will extend from the i+4th memory block backward to the i-th memory block, i.e. over 5 memory blocks.

By way of example, during a first forward recursion step, the memory block area associated with a register area YV is accessed (i.e. the memory block sub_7). Since e_si_7 has the value 1, the access operation is successful. During the subsequent backward recursion, the memory blocks sub_1, sub_10, sub_9, sub_8 and sub_7 are affected. Since all the associated control information bits have the value 1, the access operation within the context of the backward conversion is also successful.

In the next recursion step (not shown), the memory block sub_8 needs to be accessed for the forward recursion, and the memory blocks sub_2, sub_1, sub_10, sub_9 and sub_8 of the input memory ES need to be accessed for the backward recursion. While the access operation for the forward recursion is successful (since e_si_8=1), the access operation within the context of the backward recursion is not successful, since e_si_2=0.

Consequently, this backward recursion cannot be carried out, and the MAP decoder MAP_DEC is put into a waiting state until the control information bit e_si_2 is set to the value 1.

In the example described above, the individual memory blocks sub_1, sub_2, . . . , sub_10 need to be able to be read a number of times owing to forward and backward recursion operations being carried out. Accordingly, the input control information bits e_si_1, e_si_2, . . . , e_si_10 are not actually reset to the value 0 after the respective memory block has been read for the first time, but rather only after all the forward and backward recursion steps of a metric value calculation routine have been processed.

The example of memory use in the output control information memory C_ES, as shown in FIG. 4D, makes it clear that the write access operation of the MAP decoder to the output memory AS must have no more than 9 memory blocks' advance in front of the read process by the DMA channel DMA_KAN2. The memory block sub_8 is supposed to be the next memory block which will be read by the DMA channel DMA_KAN2 (which is possible because e_so_8=1). So long as this has not happened, although the MAP decoder MAP_DEC can still write new data to the memory block sub_7, it cannot write new data to the (still unread) memory block sub_8. Therefore, the MAP decoder MAP_DEC is put into the waiting state after the memory block sub_7 has had information written to it.

In the case of the memory use shown in FIG. 4D, the nine memory blocks sub_8 to sub_10 and sub_1 to sub_6 associated with the register area YV can be read by the DMA channel DMA_KAN2.

Accordingly, it is necessary to ensure for the input memory ES that data are written in via the DMA channel DMA_KAN1 by the MAP decoder MAP_DEC with an advance of no more than nine memory blocks before the memory blocks are read.

We claim:

1. A device for a bidirectional transfer of data, comprising:
    a first processor;
    a second processor;
    an input memory connected to said second processor, said input memory having a plurality of memory blocks for receiving output data from said first processor;
    an output memory with a plurality of memory blocks for providing input data for said first processor, said output memory connected to said second processor;
    an input control information memory connected to said input memory and storing an item of binary control information for each of said memory blocks of said input memory;
    an output control information memory connected to said output memory and storing an item of binary control information for each of said memory blocks of said output memory; and
    at least one direct memory access (DMA) channel for writing the output data from said first processor to said input memory and for reading the input data for said first processor from said output memory, said DMA channel connected to said first processor, said input memory and said output memory, access to said input memory and said output memory being regulated such that a write access of said first processor and a read access of said second processor to said input memory is permitted on a basis of the item of control information stored in said input control information memory, and the write access of said second processor and the read access of said first processor to said output memory is permitted on a basis of the item of control information stored in said output control information memory.

2. The device according to claim 1, wherein a write access operation of said first processor to a memory block of said input memory is permitted only if the item of binary control information for the memory block is in a first state.

3. The device according to claim 2, wherein a read access operation of said second processor to the memory block of said input memory is permitted only if the item of binary control information for the memory block is in a second state.

4. The device according to claim 1, wherein a read access operation of said first processor to a memory block of said output memory is permitted only if the item of binary control information for the memory block is in a first state.

5. The device according to claim 4, wherein a write access operation of said second processor to a memory block of said output memory is permitted only if the item of binary control information for the memory block is in a second state.

6. The device according to claim 1, wherein if said output memory and said input memory have different memory sizes, a number of the memory blocks is identical in both of said output memory and said input memory.

7. The device according to claim 1, wherein at least one of said input memory and said output memory are cyclic memories.

8. The device according to claim 1, wherein said first processor is a digital signal processor, and said second processor is a hardware logic circuit.

9. A turbo decoder for a mobile radio receiver, comprising:
   a device for a bidirectional transfer of data, including:
      a processor being a digital signal processor;
      a decoder being a hardware logic circuit;
      an input memory connected to said decoder, said input memory having a plurality of memory blocks for receiving output data from said processor;
      an output memory with a plurality of memory blocks for providing input data for said processor, said output memory connected to said decoder;
      an input control information memory connected to said decoder and storing an item of binary control information for each of said memory blocks of said input memory;
      an output control information memory connected to said decoder and storing an item of binary control information for each of said memory blocks of said output memory; and
      at least one direct memory access (DMA) channel for writing the output data from said processor to said input memory and for reading the input data for said processor from said output memory, said DMA channel connected to said processor, said input control information memory and said output control information memory, access to said input memory and said output memory being regulated such that a write access of said processor and a read access of said decoder to said input memory is permitted on a basis of the item of control information stored in said input control information memory, and the write access of said decoder and the read access of said processor to said output memory is permitted on a basis of the item of control information stored in said output control information memory.

10. A method for a bidirectional transfer of data, which comprises the steps of:
   providing a first processor, a second processor, an input memory connected to the second processor and having a plurality of memory blocks for receiving output data from the first processor, an output memory connected to the second processor and having a plurality of memory blocks for providing input data for the first processor, an input control information memory storing an item of binary control information for each of the memory blocks of the input memory, and an output control information memory storing an item of binary control information for each of the memory blocks of the output memory;
   permitting a write access operation, taking place through a direct memory access (DMA) channel, of the first processor and a read access operation of the second processor to the input memory on a basis of the item of control information stored in the input control information memory; and
   permitting the write access operation of the second processor and the read access operation, taking place through the DMA channel, of the first processor to the output memory on a basis of the item of control information stored in the output control information memory.

11. A device for a bidirectional transfer of data between a first processor and a second processor, the second processor having an input memory with a plurality of memory blocks for receiving output data from the first processor and an output memory with a plurality of memory blocks for providing input data for the first processor, the device comprising:
   an input control information memory connected to the input memory and storing an item of binary control information for each of the memory blocks of the input memory;
   an output control information memory connected to the output memory and storing an item of binary control information for each of the memory blocks of the output memory; and
   at least one direct memory access (DMA) channel for writing the output data from the first processor to the input memory and for reading the input data for the first processor from the output memory, said DMA channel connected to the first processor, the input memory and the output memory, access to the input memory and the output memory being regulated such that a write access of the first processor and a read access of the second processor to the input memory is permitted on a basis of the item of control information stored in said input control information memory, and the write access of the second processor and the read access of the first processor to the output memory is permitted on a basis of the item of control information stored in the output control information memory.

* * * * *